United States Patent [19]
Costa et al.

[11] Patent Number: 6,001,765
[45] Date of Patent: *Dec. 14, 1999

[54] CATALYTIC SYSTEM WHICH CAN BE USED FOR THE STEREOSPECIFIC POLYMERIZATION OF α-OLEFINS, PROCESS FOR THIS POLYMERIZATION AND POLYMERS OBTAINED

[75] Inventors: Jean-Louis Costa, Grimbergen; Sabine Pamart, Mons, both of Belgium

[73] Assignee: Solvay Polyolefins Europe-Belgium

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/796,572

[22] Filed: Feb. 6, 1997

Related U.S. Application Data

[63] Continuation of application No. 08/424,611, Apr. 19, 1995, abandoned, which is a continuation of application No. 08/056,779, May 4, 1993, abandoned.

[30] Foreign Application Priority Data

May 4, 1992 [BE] Belgium ................................ 09200413

[51] Int. Cl.$^6$ ........................................................ C08F 4/64
[52] U.S. Cl. ........................... 502/107; 502/114; 502/120; 502/125; 526/128
[58] Field of Search ...................................... 502/107, 114, 502/125, 109, 120

[56] References Cited

U.S. PATENT DOCUMENTS

| | | | |
|---|---|---|---|
| 4,364,851 | 12/1982 | Shiga et al. | 502/115 |
| 4,420,593 | 12/1983 | Sato et al. | 526/128 |
| 4,529,780 | 7/1985 | Foerster | 526/142 |
| 5,206,198 | 4/1993 | Costa et al. | 502/107 |

FOREIGN PATENT DOCUMENTS

| | | |
|---|---|---|
| 0261727 | 3/1988 | European Pat. Off. . |
| 0284287 | 9/1988 | European Pat. Off. . |
| 0288109 | 10/1988 | European Pat. Off. . |

*Primary Examiner*—David W. Wu
*Attorney, Agent, or Firm*—Venable; John W. Schneller

[57] ABSTRACT

Catalytic system which can be used for the polymerization of α-olefins comprising:
  a solid based on complexed titanium trichloride of δ crystalline form;
  an organoaluminium compound;
  an organic oxygenated silicon compound;
characterized in that the organoaluminium compound is a non-halogenated compound.

10 Claims, No Drawings

CATALYTIC SYSTEM WHICH CAN BE USED FOR THE STEREOSPECIFIC POLYMERIZATION OF α-OLEFINS, PROCESS FOR THIS POLYMERIZATION AND POLYMERS OBTAINED

CROSS-REFERENCE TO RELATED APPLICATIONS

This application is a continuation of application Ser. No. 08/424,611 filed Apr. 19, 1995, abandoned which is a continuation of application Ser. No. 08/056,779, May 4, 1993, now abandoned, the entire disclosures of which are incorporated herein by reference.

The present invention relates to a catalytic system which can be used for the stereospecific polymerisation of α-olefins and to a process for this polymerisation.

It is known to polymerise α-olefins using a catalytic system comprising a solid constituent based on titanium trichloride and a cocatalyst chosen from organic compounds of metals from groups Ia, IIa and IIIa of the Periodic Table (version published in Handbook of Chemistry and Physics, 50th Edition).

Among the abovementioned catalytic systems, those which contain a catalytic solid based on complexed titanium trichloride of δ crystalline form and a dialkyl-aluminium halide, very particularly diethylaluminium chloride, have a maximum activity and stereospecificity [K. Y. Choi and W. H. Ray, Rev. Macromol. Chem. Phys., C 25 (1), pg. 69–71 (1985) and P. C. Barbé, G. Cecchin, L. Noristi, Advances Polym. Sc., 81, pg. 19 (1987)]. In practice, these systems contain a large excess of dialkylaluminium halide with respect to the titanium compound [see for examples in U.S. Pat. No. 4,210,738 which corresponds to the patent BE-A-780,758

The use of such catalytic systems has disadvantages however. Indeed, the polymers which result therefrom contain a relatively large amount of chlorinated residues arising essentially from the cocatalyst which, if they are not removed, confer a corrosive nature on these polymers and detrimentally affect the stability thereof.

The use of non-halogenated cocatalysts would enable this problem to be solved but leads to resins being obtained which contain a large proportion of amorphous polymer.

Attempts have been made to overcome this disadvantage by adding to this catalytic system a third constituent which is generally an electron-donating compound and preferably an amino or organophosphorus compound [Patent GB-A-1, 486,194 (Imperial Chemical Industries)]. The improvement in stereospecificity which results therefrom is insufficient and is achieved to the detriment of the catalytic productivity.

It has now been found that the combination of certain catalytic solids based on complexed titanium trichloride, of δ crystalline form, with a non-halogenated organoaluminium cocatalyst and a specific third constituent leads to halogen-poor catalytic systems which do not have the disadvantages of the systems described earlier.

The present invention correspondingly relates to a catalytic system which can be used for the polymerisation of α-olefins comprising at least:

(a) one solid based on complexed titanium trichloride, of δ crystalline form;

(b) one organoaluminium compound;

(c) one organic oxygenated silicon compound; characterised in that the organoaluminium compound is a non-halogenated compound.

In the present invention, organic oxygenated silicon compound [compound (c)] is understood to denote the silicon compounds in which the molecule comprises at least one hydrocarbon group bonded via an oxygen atom.

These compounds (c) are most often chosen from the compounds represented by the general formula:

$$R'_n Si(OR'')_{4-n} \qquad (I)$$

in which

R' represents a hydrogen atom or a hydrocarbon radical containing from 1 to 20 carbon atoms, chosen for example from alkyl, cycloalkyl, alkenyl, aryl, alkylaryl and arylalkyl radicals, which radicals can themselves carry substituents such as amino groups. R' is preferably chosen from alkyl, aryl and cycloalkyl radicals containing preferably from 1 to 18 carbon atoms;

R" represents a hydrocarbon radical, identical to or different from R', containing from 1 to 12 carbon atoms and chosen for example from alkyl, cycloalkyl, alkenyl, aryl, alkylaryl and arylalkyl radicals, which radicals can themselves be substituted by groups such as alkoxy groups. Preferably, R" is chosen from alkyl and aryl radicals containing from 1 to 8 carbon atoms;

n is an integer such that $0 \leq n \leq 3$.

In the compounds (C), the n radicals R' and the (4−n) radicals R" can each, independently of each other, represent identical or different organic radicals. Moreover, the catalytic systems according to the invention can contain one or more compounds (c).

Examples of organic silicon compounds (c) which can be used in the catalytic systems according to the invention are tetra-, tri- and dimethoxysilanes and tetra-, tri- and diethoxysilanes, optionally substituted by alkyl, cycloalkyl or aryl radicals, which are identical or different, chosen for example from methyl, ethyl, n-propyl, isopropyl, n-butyl, isobutyl, tert-butyl, n-amyl, isoamyl, cyclopentyl, n-hexyl, cyclohexyl or phenyl radicals.

The compounds (c) preferentially used in the catalytic systems according to the invention are compounds corresponding to the formula (I) which contain one or two substituents (OR") in which the radicals R", which are identical or different, are chosen from hydrocarbon radicals containing from 1 to 3 carbon atoms and at least one substituent R' chosen from alkyl and cycloalkyl radicals containing at least one secondary or tertiary carbon atom. The compounds (c) which have given the best results are dimethoxy- and diethoxysilanes substituted by at least one alkyl or cycloalkyl radical containing a secondary or tertiary carbon atom in the α, β or γ position.

As examples of such compounds (c), there may be mentioned diisobutyldimethoxysilane, di(tert-butyl) dimethoxysilane, diisopropyldimethoxysilane, dicyclohexyldimethoxysilane, cyclohexylmethyldimethoxysilane or isobutylmethyldimethoxysilane.

The catalytic systems according to the invention additionally contain a non-halogenated organoaluminium compound [compound (b)] corresponding to the formula:

$$AlR_m Y_{3-m} \qquad (II)$$

where:

R represents a hydrocarbon radical, containing from 1 to 18 carbon atoms and preferably from 1 to 12 carbon atoms chosen from alkyl, aryl, arylalkyl, alkylaryl and cycloalkyl radicals;

Y represents a group chosen from $-OR^1$, $-SR^1$ and $-NR^1R^2$ in which $R^1$ and $R^2$ each represent an identical or different hydrocarbon radical chosen from alkyl, aryl, arylalkyl, alkylaryl and cycloalkyl radicals preferably containing from 1 to 20 carbon atoms;

m is a number such that 0<m≦3.

As examples of compound (b) which can be used in the catalytic systems according to the invention, there may be mentioned trialkylaluminiums such as, for example, trimethylaluminium, triethylaluminium, tripropylaluminium, triisopropylaluminium, tributylaluminium, triisobutylaluminium, trihexylaluminium, trioctylaluminium or tridodecylaluminium, and alkoxyalkylaliminiums such as, for example, diethylethoxyaluminium.

Non-halogenated organoaluminium compounds (b) which can also be used in the catalytic systems according to the invention are aluminoxane-type oligomers existing in the cyclic and/or linear form which can be represented by the general formulae:

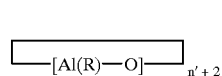
(III)

and $(R)_2Al-O-[Al(R)-O]_{n'}-Al(R)_2$ (IV)

in which R has the meaning given above for formula (II) and n' is an integer generally between 2 and 50. As examples of compound (b) of formula (III) and (IV), there may be mentioned methyl, ethyl, and butylaluminoxanes.

It is obvious that the catalytic systems according to the invention may contain one or more compounds (b).

The compounds (b) are preferably chosen from trialkylaluminiums and alkylalkoxyaluminiums and their mixtures.

The most outstanding catalytic systems contain, as compounds (b), a trialkylaluminium or a mixture of trialkylaluminiums. Finally, trialkylaluminiums in which the alkyl radicals contain more than two carbon atoms have the advantage of being able to be used over a wide range of aluminium of compound (b)/titanium of compound (a) ratios without variations in the properties of the polymers which result therefrom being observed.

Besides the organoaluminium compound (b) and the organic oxygenated silicon compound (c), the catalytic systems according to the invention comprise a catalytic solid based on complexed titanium trichloride, of δ crystalline form [compound (a)]. In the context of the present invention, compound (a) is understood to denote catalytic solids based on complexed titanium trichloride, of δ crystalline form, essentially free of magnesium, obtained by processes involving a reduction of a titanium compound by an organoaluminium reducing agent. These catalytic solids based on titanium trichloride belong to the δ crystalline form as defined, for example, in Journal of Polymer Science, 51, pages 399–410 (1961). Such solids are generally purple in colour.

According to the present invention, there are preferably used two types of compound (a) which can be characterised by their method of production [compounds (a1) and (a2)].

Compound (a1) which can be used in the catalytic systems according to the invention is obtained by successive or combined treatments of the solids resulting from the reduction of titanium tetrachloride or tetraalkoxide by an organoaluminium reducing agent (1), by an electron-donating compound (2) and by a halogenated compound (3).

Organoaluminium reducing agents (1) which can preferably be used for producing the constituent (a1) are compounds which contain at least one hydrocarbon radical attached directly to the aluminium atom. Examples of compounds of this type are mono-, di- and trialkylaluminiums in which the alkyl radicals contain from 1 to 12, preferably from 1 to 6, carbon atoms, such as alkylaluminium chlorides, trialkylaluminiums and alkylalkoxyaluminiums. As examples of these compounds, there may be mentioned diethylaluminium chloride, triethylaluminium, isoprenylaluminiums, diisobutylaluminium hydride, diethylethoxyaluminium and ethylaluminium sesquichloride. The best results are obtained with dialkylaluminium chlorides and, in particular, with diethylaluminium chloride.

The electron-donating compound (2) is preferably chosen from the family of the aliphatic ethers, and more particularly from those in which the aliphatic radicals each comprise from 2 to 8 carbon atoms, preferably from 4 to 6 carbon atoms. A typical example of an aliphatic ether giving very good results is diisoamyl ether. Di(n-butyl) ether is equally suitable.

The halogenated compound (3) is chosen from inorganic halogenated compounds, organic halogenated compounds, interhalogen compounds and halogens. Among these compounds (3), there may be mentioned:

as inorganic halogenated compounds: metal and nonmetal halides, such as titanium or silicon halides for example and more particularly titanium tetrachloride;

as organic halogenated compounds: halogenated hydrocarbons such as halogenated alkanes and carbon tetrahalides for example and more particularly hexachloroethane;

as interhalogen compounds: the chlorides and bromides of iodine for example;

as halogen: chlorine, bromine or iodine.

Organic and inorganic halogenated compounds are suitable.

The best results were obtained with inorganic halogenated compounds and in particular with titanium tetrachloride.

Preferably, the treatment by means of the halogenated compound (3) is carried out following upon the treatment by means of the electron-donating compound and is most often carried out in the presence of a residual amount of the latter. This residual amount can result from a partial removal from the solution used during the treatment with the electron-donating compound or from a supplementary addition of electron-donating compound during the treatment by means of the halogenated compound.

The stages and treatments for the preparation of compound (a1) described above can be carried out in an inert hydrocarbon diluent generally chosen from the liquid aliphatic, cycloaliphatic and aromatic hydrocarbons, such as liquid alkanes, cycloalkanes or isoalkanes, or benzene. The mixtures of these diluents are equally suitable.

Compounds (a1) of this type which are particularly suitable for formation of the catalytic systems according to the invention are described in U.S. Pat. No. 4,210,738 which corresponds to the patent BE-A-780,758, the contents of which are incorporated for reference in the present description.

At any point during its preparation, after the reduction stage or after treatment with the electron-donating compound (2) or after treatment with the halogenated compound (3), but preferably after the reduction stage, the solid based on $TiCl_3$ can be subjected to a treatment which aims at reducing the friability of its constituent particles. This treatment, called "prepolymerisation", consists in bringing the solid into contact with an α-olefin, such as for example propylene or ethylene, under polymerising conditions so as to obtain a solid generally containing from approximately 5 to approximately 500% by weight of "prepolymerised" α-olefin with respect to the weight of titanium trichloride.

The catalytic solid based on complexed titanium trichloride of δ crystalline form of type (a1) can also be activated by bringing it into contact with an activation agent so as to maintain the stability thereof and/or to increase the stereospecifity thereof. This activation treatment consists in bringing the solid based on complexed titanium trichloride of δ crystalline form, preferably separated from the medium in which it was prepared and washed with an inert hydrocarbon diluent as defined above, into contact with an activation agent chosen from organoaluminium compounds and the products of the reaction of an organoaluminium compound with a compound chosen from hydroxyaromatic compounds in which the hydroxyl group is sterically blocked. The organoaluminium compound is preferably chosen from trialkylaluminium and alkylaluminium chlorides. Among these compounds, the best results are obtained with triethylaluminium and diethylaluminium chloride. The hydroxyaromatic aromatic compound in which the hydroxyl group is sterically blocked is preferably chosen from phenols which are di(tert-alkylated) in the positions also with respect to the hydroxyl group and the esters of 3-(3',5'-di(tert-butyl)-4'-hydroxyphenyl)propionic acid. Among these compounds, the best results were obtained with 2, 6-di(tert-butyl)-4-methylphenol and n-octadecyl 3-(3',5'-di(tert-butyl)-4'-hydroxyphenyl)propionate.

Other details with respect to the additional activation treatments defined above, especially the nature of the organoaluminium and hydroxyaromatic compounds and the operating conditions under which they are carried out are described in U.S. Pat. No. 4,210,729 which corresponds to the patent BE-A-803,875 (Solvay), the contents of which are incorporated for reference in the present application.

Activated compounds (a1) leading to the best results are those resulting from the method of preparation described in the patent application EP-A-261,727. These constituents result from the activation treatment of the catalytic solids based on complexed titanium trichloride of δ crystalline form of type (a1) obtained according to U.S. Pat. No. 4,210,738 which corresponds to the patent BE-A-780,758 above and which have preferably been subjected to the prepolymerisation treatment.

When the catalytic systems according to the present invention contain a catalytic solid based on titanium trichloride of δ crystalline form of type (a1), having or not having been subjected to the activation and/or prepolymerisation treatment, the amounts of compounds (a1), (b) and (c) used are generally such that the molar ratio of the aluminium of the compound (b) to the titanium of the compound (a1) varies from 1 to 50. These amounts are additionally such that the molar ratio of this aluminium to the silicon of the compound (c) varies from 0.1 to 50. In particular, good results are obtained when the molar ratio of the aluminium of (b) to the titanium of (a1) is greater than or equal to approximately 1.5 and more particularly greater than or equal to approximately 2. The smaller ratio is additionally most often less than or equal to approximately 25 and preferably less than or equal to approximately 20. The catalytic systems of this type which show good results generally have a molar ratio of the aluminium of the compound (b) to the silicon of the compound (c) which is greater than or equal to approximately 1, preferably greater than or equal to approximately 1.5. This ratio is most often less than or equal to approximately 10 and preferably less than or equal to approximately 5.

The catalytic systems according to the invention can also contain, as catalytic solid based on complexed titanium trichloride of δ crystalline form, a compound (a2) obtained by heat treatment, in the presence of a halogenated agent (3) as defined above, of the liquid material resulting from bringing $TiCl_4$, pretreated with an electron-donating compound (2) also as defined above, into contact with a composition (0) corresponding to the general formula:

$$AlR_pZ_qX_{3-(p+q)} \quad (V)$$

in which

R represents a hydrocarbon radical as defined above with respect to formula (II);

Z represents a group chosen from $-OR^4$, $-SR^4$ and $-NR^4R^5$ in which $R^4$ and $R^5$ each represent a hydrocarbon radical or a hydrogen atom;

X represents a halogen atom;

p is any number such that 0<p<3;

q is any number such that 0<q<3;

the sum (p+q) being such that $0<(p+q)\leq 3$.

In formula (V), X is preferably chlorine; R is preferably chosen from linear or branched alkyl radicals containing from 2 to 8 carbon atoms; Z is preferably chosen from groups $-OR^4$ in which R' is a linear or branched alkyl radical containing from 1 to 12 carbon atoms or an optionally substituted aryl radical containing from 6 to 35 carbon atoms. A very particularly preferred radical R is the ethyl radical. Very particularly preferred radicals $R^4$ are ethyl and amyl radicals such as the iso- and n-amyl radicals.

In formula (V), p is preferably a number such that $1\leq p\leq 2$ and q preferably a number such that $0.1\leq q\leq 2$.

The compositions (0) can be defined chemical compounds or mixtures of compounds. The formula (V) must thus be considered as an empirical structural formula representing said compounds or, in the case of mixtures, representing the average composition of the latter.

The compositions (0) can be prepared by bringing:

an organoaluminium compound (A) of general formula:

$$AlR_rX_{3-r} \quad (VI)$$

into contact with a compound (B) chosen from the compounds of general formula:

$$AlR_tZ_{t'}X_{3-(t+t')} \quad (VII);$$

$$ZH \quad (VIII);$$

and the aluminoxane-type oligomers of formula (III) and (IV) in proportions suitable for producing a composition (0) corresponding to the formula (V) above.

In the formulae (VI), (VII) and (VIII) above, R, Z and X respectively have the meanings given above with regard to the formula (V). In the formula (VI), r is any number such that $0<r\leq 3$ and, in the formula (VII), t is any number such that $0\leq t<3$ and t' is any number such that $0<t'\leq 3$, the sum (t +t') being such that $0<(t+t')\leq 3$.

Preferred compounds (A) are dialkylaluminium chlorides, very particularly diethylaluminium chloride. The preferred compounds (B) of formula (VII) are alkylalkoxyaluminiums and their chlorides, very particularly diethylethoxyaluminium and ethylethoxy- and ethylisopentoxyaluminium monochlorides. As examples of compounds (B) of formula (VIII), there may be mentioned alcohols, thioalcohols, phenols, thiophenols and secondary amines. Very particularly preferred compounds (B) of formula (VIII) are aliphatic alcohols and in particular ethanol and iso- and n-amyl alcohols.

A particularly preferred and simple procedure for the preparation of the composition (0) comprises bringing a compound (A), such as an alkylated aluminium compound, into contact with a compound (B), such as an aliphatic alcohol, in a ratio of the aluminium contained in the compound (A) to the hydrocarbon radical contained in the compound (B) of between 1:0.1 and 1:3.

Another method of preparation giving good results comprises bringing a compound (A), such as an alkylated aluminium compound, into contact with the compound (B), such as an alkylalkoxyaluminium, in a ratio of the aluminium contained in the compound (A) to the alkoxy radical contained in the compound (B) of between 1:0.1 and 1:10.

For the preparation of the compounds (a2) which can be used in the catalytic systems according to the present invention, the composition (0) is brought into contact with $TiCl_4$, itself pretreated with an electron-donating compound (2) as defined above. A typical example of an electron-donating compound (2) giving very good results is here also diisoamyl ether. Di(n-butyl) ether is equally suitable.

The molar ratio of $TiCl_4$ to the electron-donating agent (2) can vary within wide limits. It generally varies from 0.01 mol to 20 mol of $TiCl_4$ per mole of electron-donating compound.

The general conditions for bringing $TiCl_4$, pretreated with the electron-donating compound as described above (hereafter more briefly called "pretreated $TiCl_4$"), into contact with the composition (0) are not critical provided that they lead to the formation of a substantially homogeneous and solid-free liquid material. The composition (0) and pretreated $TICl_4$ are brought into contact in respective amounts such that an at least partial reduction of the $TiCl_4$ takes place without concomitant substantial production of solid precipitate. To this end, the amount of composition (0) brought into contact with pretreated $TiCl_4$ is such that the atomic ratio of the aluminium contained in the composition (0) to the titanium contained in pretreated $TiCl_4$ is generally from 0.05 to 10, preferably from 0.2 to 2. The temperature at which the composition (0) and pretreated $TiCl_4$ are brought into contact generally varies from 0 to 60° C., preferably from 10 to 40° C.

For the preparation of the catalytic solids according to the invention, the liquid material obtained as shown above must be converted to solid particles. To this end, the said material is subjected to a heat treatment, generally lasting from 5 to 150 minutes, in the presence of a halogenated compound (3) as defined above so as to induce the substantial precipitation of solid particles based on complexed titanium trichloride.

To this end, the liquid material is gradually brought, continuously or in a succession of stages, to a temperature which does not exceed the boiling point of the liquid material and which most often varies from 80 to 120° C.

The preferred halogenated compound (3) for the preparation of the compounds (a2) is titanium tetrachloride. It can be added to the liquid material at any time during the heat treatment.

In particular, when $TiCl_4$ is used as the halogenated compound (3), this $TiCl_4$ can advantageously arise from an unreduced excess of initial $TiCl_4$ from which the catalytic solids according to the invention are prepared.

The amount of halogenated compound (3) used, expressed with respect to the amount of titanium trichloride present in the liquid material, is generally from 0.1 to 20 mol of halogenated compound (3) per mole titanium trichloride.

The solid particles thus obtained can then be subjected to a maturing generally carried out at the temperature reached at the end of the heat treatment, then preferably separated from their preparation medium and optionally washed by means of an inert hydrocarbon diluent as described above and which can also be used for preparing the solid based on complexed titanium trichloride [compound (a2)].

Other details with respect to the operating conditions under which the synthesis of the compound (a2) is carried out are described in U.S. Pat. No. 5,206,198 which corresponds to Belgian Patent Application 9,001,054, filed on Nov. 8, 1990, the contents of which are incorporated for reference in the present description.

The compound (a2) thus obtained is formed of solid particles of complexed titanium trichloride of δ crystalline form, with a generally purple colour, with a substantially spherical general shape, with a narrow particle size distribution and with a mean diameter of between 5 and 150 μm. Its titanium trichloride content is generally greater than 50% of its weight and its content of electron-donating compound is generally less than 15% by weight with respect to the total weight of the particles.

The porosity of the particles of compounds (a2) depends on the choice of the operating conditions of their preparation. It has thus been observed, in particular, all other conditions remaining substantially unchanged, that increasing the content of Z groups in the composition (0) leads to a modification of the porosity of the particles of catalytic solid and in particular to an increase in the internal pore volume of these particles generated by pores whose radii vary from 1000 to 15,000 Å (hereafter more simply called IPV). By virtue of the process of manufacture of the catalytic solids according to the invention, it is thus possible to adjust their porosity, especially the IPV, from values as low as approximately 0.02 $cm^3/g$ to values as high as approximately 0.4 $cm^3/g$.

The use, in the catalytic systems according to the invention, of compounds (a2) of high porosity is particularly suitable for the manufacture of highly impact-resistant sequential copolymers obtained by incorporating, in a propylene polymer prepared in a first stage, large amounts of a propylene elastomer prepared in a second stage.

Indeed, the increase in the porosity of the compounds (a2) in the region of the pore radii described above leads especially to α-olefin polymers of increasing porosity, which makes it possible to incorporate therein large and increasing amounts of elastomeric products without encountering adhesion problems.

Another advantage of the use of these compounds (a2) is that they lead to polymers in which the incorporation of additives such as pigments or stabilising agents is particularly easy.

Various variations can be introduced into this process for producing the compound (a2) without departing from the context of the latter.

A first implementational variation (i) consists in adding, to the medium for the preparation of the catalytic solid based on complexed $TiCl_3$, at any time but preferably before the heat treatment of the liquid material, an organic or inorganic support (S) having a porous texture such that the solid particles based on complexed titanium trichloride are deposited at the surface of the support (S) or precipitate inside the pores of the latter.

As examples of support (S), there may be mentioned preformed polymers, oxides of silicon, aluminium, magnesium, titanium or zirconium, and mixtures of these oxides.

A second implementational variation (ii) consists in subjecting the catalytic solid particles based on complexed titanium trichloride of δ crystalline form, optionally prepared in the presence of the support (S), to a prepolymerisation treatment as described above with respect to the compounds of type (a1).

A third implementational variation (iii) consists in subjecting these catalytic solid particles based on complexed titanium trichloride, optionally prepared in the presence of the support (S), to an activation treatment identical to that described above for producing the constituents (a1).

It is also possible to combine the variations (ii) and (iii) described above, that is to say to subject the catalytic solid particles, optionally prepared in the presence of the support (S), to the additional activation treatment simultaneously with the "prepolymerisation" treatment.

It is also possible to combine the variations (ii) and (iii) by carrying them out successively.

Details relating to these variations can also be found in U.S. Pat. No. 5,206,198 which corresponds to the patent application BE-A-9,001,054.

When the catalytic systems according to the present invention contain a compound (a2) as solid based on complexed titanium trichloride of δ crystalline form, the amounts of compounds (a2), (b) and (c) used are generally such that the molar ratio of the aluminium of (b) to the titanium of (a2) varies from 1 to 50. These conditions are additionally such that the molar ratio of the aluminium of (b) to the silicon of (c) varies from 0.1 to 50. In particular, good results are obtained when the molar ratio of the aluminium of (b) to the titanium of (a2) is greater than or equal to approximately 1.5 and more particularly greater than or equal to approximately 2. This molar ratio is additionally most often less than or equal to approximately 25, preferably less than or equal to approximately 20. The catalytic systems of this type showing good results generally have a molar ratio of the aluminium of the compound (b) to the silicon of the compound (c) which is greater than or equal to approximately 1 and preferably greater than or equal to approximately 1.5. This ratio is most often less than or equal to approximately 10 and preferably less than or equal to approximately 5.

It is possible to use high molar ratios of aluminium to silicon when it is desired to produce polymers having poorer isotacticities. These polymers are generally obtained by using molar ratios of the aluminium of (b) to the silicon of (c) which are greater than approximately 4. In this case, this ratio is generally less than or equal to approximately 30 and preferably less than or equal to approximately 25. Polymerisation processes which are particularly well suited for producing these polymers having poorer isotacticity are the gas phase polymerisation processes.

The catalytic systems thus defined are applied to the polymerisation of olefins having end unsaturation such as α-olefins in which the molecule contains from 2 to 18 and preferably from 2 to 6 carbon atoms and in particular ethylene, propylene, 1-butene, 1-pentene, 1-methylbutenes, hexene or 3- and 4-methyl-1-pentenes.

Consequently, the present invention also relates to a process for homo- and/or copolymerisation using one or more of the monomers mentioned above under polymerisation conditions in the presence of one or the other of the catalytic systems described above. A particularly advantageous polymerisation process relates to the stereospecific polymerisation of propylene, 1-butene and 4-methyl-1-pentene to crystalline polymers. The catalytic systems are also applied to the copolymerisation of these α-olefins with at least one non-identical comonomer chosen from the α-olefins as described above and diolefins comprising from 4 to 18 carbon atoms. The diolefins are preferably non-conjugated aliphatic diolefins such as 1,4-hexadiene, non-conjugated monocyclic diolefins such as 4-vinylcyclohexene, alicyclic diolefins having an endocyclic bridge such as dicyclopentadiene or methylene- and ethylidenenorbornene and conjugated aliphatic diolefins such as butadiene or isoprene.

They are also applied to the manufacture of so-called block copolymers which are made starting from α-olefins and/or diolefins. These block copolymers consist of distinct blocks of variable composition; each block consists of a homopolymer of an α-olefin or of a statistical copolymer comprising an α-olefin and at least one comonomer chosen from α-olefins and diolefins. The α-olefins and diolefins are chosen from those mentioned above.

The catalytic systems according to the invention are particularly well suited for the manufacture of copolymers of propylene and of copolymers of the latter containing in total at least 50% by weight of propylene and preferably at least 60% by weight of propylene.

Generally, in this case, the polymerisation temperature varies from 20 to 200° C. and preferably from 50 to 100° C., the best results being obtained from 65 to 95° C. The pressure is generally chosen between atmospheric pressure and 60 atmospheres and preferably from 10 to 50 atmospheres. This pressure can depend on the temperature at which the polymerisation is carried out.

The polymerisation can be carried out continuously or noncontinuously.

The polymerisation can be carried out according to any known process: in solution or in suspension in an inert hydrocarbon diluent, such as those defined with respect to the preparation of the compounds (a). The diluent preferably used during the polymerisation is generally chosen from butane, isobutane, hexane, heptane, cyclohexane, methylcyclohexane or their mixtures. It is also possible to carry out the polymerisation in the monomer or in one of the monomers maintained in the liquid state or even in the gaseous phase.

The amount of the various compounds of the catalytic systems according to the invention used for this polymerisation is not critical provided that the ratios between the various compounds (a), (b) and (c) are respected. The polymerisation is generally carried out so that the total amount of organometallic compound (b) is greater than 0.1 mmol per litre of diluent, of liquid monomer or of reactor volume and preferably greater than or equal to 0.5 mmol per litre.

The compounds (a), (b) and (c) are generally added separately to the polymerisation medium. The order of introduction of these compounds is not critical. However, it may prove advantageous to introduce compound (a) last.

A precontact can also be carried out between compound (b) and compound (c) or between compound (a) and one or the other of compounds (b) and (c), or between these three compounds before using them for the polymerisation.

Such a precontact is generally carried out at a variable temperature of −40 to +80° C. for a period of time which depends on this temperature and which can range from a few seconds to a number of hours or even a number of days.

However, when the precontact involves compound (a), it is preferable to limit the period of time of precontact to a few seconds or even a few minutes.

The mean molecular mass of the polymers manufactured according to the process according to the invention can be adjusted by the addition to the polymerisation medium of one or more agents for adjusting the mean molecular mass, such as hydrogen, diethylzinc, alcohols, ethers and alkylhalides. Hydrogen is quite suitable.

The catalytic systems according to the invention can preferably used for the production, with particularly high yields, of propylene polymers having a wide stereospecificity range.

Additionally, the catalytic systems are particularly well suited to the polymerisation of propylene at high temperature. Under these conditions, particularly high polymerisation yields are observed with insignificant reduction in the stereospecificity.

The use of the catalytic systems according to the invention makes it possible to produce, with good yields, polymers containing a lower amount of chlorine than that measured on polymers resulting from conventional catalytic systems based on titanium trichloride. For this reason, the polymers obtained are more stable and their use does not lead to corrosion of the devices used for this purpose. Additionally, the stabilisation of these polymers requires smaller amounts of additives, which constitutes not only an economic advantage but also makes it possible to use the said polymers in applications where a high purity is required.

The catalytic systems according to the invention also make it possible, when they are used in gas phase polymerisation processes, to avoid the formation, in the polymerisation reactor or in the device for circulating the gaseous monomers, of low molecular mass polymers existing in the form of viscous or semi-solids oils capable of disturbing the smooth operation of the polymerisation reactor. Such a use of the catalytic systems according to the invention is consequently particularly favourable.

Finally, the catalytic systems according to the invention make it possible to produce, with very good yields, propylene polymers of very high mean molecular mass. According to the present invention, propylene polymers of very high molecular mass is understood to mean propylene polymers of which the mean molecular mass by weight ($M_w$) is at least $8·10^5$ g/mole. The mean molecular mass by weight is preferably greater than $1.0·10^6$ g/mole and can reach values as high/as $1.2·10^6$ g/mole. Propylene polymers of this type capable of being obtained under the polymerisation processes according to the invention are propylene homopolymers as well as propylene copolymers as defined above. These polymers are obtained with good yields in the various polymerisation processes when the polymerisation medium does not contain an agent for adjusting the molecular mass.

The following examples are used to illustrate the invention.

The meaning of the symbols used in these examples, the units expressing the quantities mentioned and the methods for measuring these quantities are explained below.

IPV=internal pore volume of the catalytic solid measured in the region of the pore radii of between 1000 and 15,000 Å and expressed in cm$^3$/g, measured by the mercury penetration method using porosimeters marketed by the firm Carlo Erba Co.

act.=catalytic activity expressed conventionally in grams of polymer obtained per hour and per gram of TiCl$_3$ contained in the catalytic solid. This activity is estimated indirectly from the determination by X-ray fluorescence of the residual titanium content in the polymer.

AD=the apparent density of the insoluble polymer expressed in g/dm$^3$.

fTri=isotacticity index of the polymer, estimated by the molar fraction of isotactic triads (sequenced chain of three propylene monomer units in meso configuration) in the overall polymer. This value is determined by $^{13}$C nuclear magnetic resonance as described in Macromolecules, Volume 6, No. 6, pages 925–926 (1973) and in references (3) to (9) of this publication.

I.I.=isotacticity index of the polymer, estimated by that fraction of the latter, expressed as a % by weight in respect to the total amount of polymer collected, which is insoluble in boiling heptane.

MFI=melt flow index measured with a load of 2.16 kg at 230° C. and expressed in g/10 min (ASTM standard D 1238).

η=intrinsic viscosity of the polymer measured in solution in tetralin at 140° C. and expressed in g/dl.

$M_w$=mean molecular mass by weight expressed in g/mol and measured by steric exclusion chromatography in 1,2,4-trichlorobenzene at 135° C. on a Waters type 150C chromatograph.

TEAL=triethylaluminium.

TBAL=tributylaluminium.

DIBDMS=diisobutyldimethoxysilane.

nPTMS=n-propyltrimethoxysilane.

DPDMS=diphenyldimethoxysilane.

Et=ethyl radical or $C_2H_5$—.

Isoamyl=isoamyl radical or $(CH_3)_2CH-CH_2-CH_2-$.

EXAMPLE 1

Example 1 illustrates a catalytic system according to the invention containing, as solid based on complexed TiCl$_3$ of δ crystalline form, a compound (a1) which has not been subjected to any prepolymerisation or activation treatment.

A—Preparation of Compound (a1)

90 ml of dry hexane and 60 ml of pure TiCl$_4$ are introduced, under a nitrogen atmosphere, into an 800 ml reactor equipped with a 2-bladed stirrer rotating at 400 revolutions/min. This hexane/TiCl$_4$ solution is cooled to 0(±1) ° C. A solution of 190 ml of hexane and 70 ml of diethylaluminium chloride (DEAC) is added thereto over 4 h while maintaining the temperature of 0 (±1)° C. in the reactor.

After addition of the DEAC/hexane solution, the reaction mixture, consisting of a suspension of fine particles, is kept stirring at 1 (±1)° C. for 15 min, is then brought over 1 h to 25° C., maintained for 1 h at this temperature and then brought over approximately 1 h to 65° C. The mixture is kept stirring for 2 h at 65° C.

The liquid phase is then separated from the solid and the solid is washed with dry hexane.

The reduced solid thus obtained is suspended in 456 ml of diluent (hexane) and 86 ml of diisoamyl ether (DIAE) are added thereto. The suspension is stirred at 250 rev/min for 1 h at 50° C. and then allowed to settle. After having removed the supernatant, the solid is resuspended in 210 ml of hexane and 52 ml of TiCl$_4$ are added thereto. The suspension is then kept stirring (150 rev/min) at 75° C. for 2 h. The liquid phase is then removed by filtration and the solid based on complexed titanium trichloride is washed with dry hexane and then dried in a fluidised bed under nitrogen at 70° C.

The catalytic solid thus obtained, which is purple in colour, contains, per kg, 875 g of TiCl$_3$ of δ crystalline form and 85 g of DIAE.

B—Polymerisation of Propylene in Suspension in the Liquid Monomer (Reference Conditions)

The following are introduced, while purging with dry nitrogen, into a 5 l autoclave which has been dried beforehand:

- 228 mg (2mmol) of TEAL (in the form of a 200 g/l solution in hexane);
- 176.8 mg of DIBDMS (in the form of a 0.384 mol/l solution in hexane):
- 59 mg of compound (a1) as prepared in Stage A;
- a hydrogen pressure of approximately 1 bar;
- 3 l of liquid propylene;

so that the molar ratio of the aluminium of the TEAL to the titanium of compound (a1) is equal to 6 and that the molar ratio of the aluminium of the TEAL to the silicon of the DIBDMS is equal to 2.3.

The reactor is maintained at 80° C. with stirring for 2 hours. The excess propylene is then degassed and the polymer formed recovered, being 664 g of dry polypropylene containing 18 ppm of titanium, 40 ppm of chlorine and having the following characteristics:

AD=467;
fTri=93;
I.I.=96.3;
MFI=0.44.

The $\alpha$ activity of compound (a1) is 8626.

Comparative Example 2R

This example illustrates polymerisation of propylene by means of a catalytic system containing 70 mg of compound (a1) described in Example 1 and 480 mg of diethylaluminium chloride (DEAC).

The polymerisation test in liquid propylene (3 h, 80° C.) makes it possible to obtain, with an activity of 3700, a polymer containing 28 ppm of titanium; 270 ppm of chlorine and having the following characteristics:

AD=480;
I.I.=95.8;
MFI=2.5.

Comparison of this example and Example 1 shows clearly that the catalytic systems according to the invention are particularly active. Moreover, the catalytic systems according to the invention lead, at equal productivity, to a polymer containing less chlorine by a factor of approximately 4.3.

EXAMPLES 3 to 10R

The following Examples 3 to 10R illustrate catalytic systems containing compounds (a1) which have been subjected to prepolymerisation and an activation treatment. Examples 3 to 9 are carried out according to the invention. Example 10R is a comparative example.

EXAMPLES 3 and 4

A—Preparation of compound (a1)

A solid based on complexed titanium trichloride is prepared as described in Example 1. However, after treating the reduced solid suspension with stirring for 2 hours at 65° C. and cooling to approximately 550° C., propylene is introduced under a pressure of 2 bars into the head space of the reactor. This introduction is continued for a sufficient time (approximately 45 min) to obtain, per kg of final solid, 65 g of polymerised propylene. The suspension of thus prepolymerised solid is then cooled to 400° C. and washed with dry hexane. The preparation is then continued as shown in Example 1, Part A.

The solid based on complexed $TiCl_3$ thus obtained is then resuspended in hexane (at a concentration of 4 ml of hexane per gram of solid) and brought into contact with 120 ml of a solution containing, per litre of hexane, 80 g of DEAC and 176.2 g of n-octadecyl 3-(3',5'-di(tert-butyl)-4'-hydroxyphenyl)propionate marketed under the name Irganox 1076 by Ciba-Geigy.

The suspension with the added solution is kept stirring for 1 hour at 30° C.

After settling, the resulting activated catalytic solid is washed with dry hexane, with resuspension of the solid.

The activated catalytic solid thus obtained contains, per kg, 720 g of $TiCl_3$ and 40 g of DIAE.

B—Polymerisation of Propylene in Suspension in the Liquid Monomer

The characteristics of the catalytic systems used are shown in Table I, as well as the results of the polymerisation tests (reference conditions) carried out in the presence of this compound (a1).

TABLE I

| Examples | 3 | 4 |
|---|---|---|
| Catalytic systems | | |
| compound (b) | TEAL | |
| compound (c) | DIBDMS | |
| quantity of (b) (mmol) | 2 | 2 |
| Al/Ti molar ratio | 4.6 | 11.4 |
| Al/Si molar ratio | 1.8 | 2.0 |
| Polymerisation results | | |
| act. | 9703 | 6750 |
| AD | 502 | 494 |
| fTri | 92 | 93 |
| I.I. | 97.9 | 97.4 |
| MFI | 0.2 | 1.7 |
| Cl in the polymer (ppm) | 36 | 51 |

EXAMPLE 5

Example 5 illustrates the production of high molecular weight polypropylene by means of compound (a1) described in Example 3. Polymerisation is carried out under the conditions of Example 1, Part B but with the polymerisation temperature being maintained at 65° C. for 2 h and with no introduction of hydrogen. The characteristics of this test are shown in Table II below.

TABLE II

| Examples | 5 |
|---|---|
| Catalytic systems | |
| compound (b) | TEAL |
| compound (c) | DIBDMS |
| quantity of (b) (mmol) | 2 |
| Al/Ti molar ratio | 8.6 |
| Al/Si molar ratio | 2.0 |
| Polymerisation results | |
| act. | 5544 |
| AD | 490 |
| fTri | 90 |
| I.I. | 95.8 |
| MFI | non-measurable |
| η | 1.07 |
| $M_w$ | 1,175,000 |

EXAMPLE 6 and 7

These examples illustrate the use of various silicon compounds in polymerisation tests as described in Example 5 (65° C.–2 h) but introducing approximately 1 bar of hydrogen.

The composition of the catalytic systems and the results of the polymerisation tests are shown in Table III below.

TABLE III

| Examples | 6 | 7 |
|---|---|---|
| Catalytic systems | | |
| compound (b) | TEAL | TEAL |
| compound (c) | DIBDMS | DPDMS |
| quantity of (b) (mmol) | 2 | 2 |
| Al/Ti molar ratio | 6.5 | 7.3 |
| Al/Si molar ratio | 2.0 | 2.0 |
| Polymerisation results | | |
| act. | 4704 | 3528 |
| AD | 472 | 436 |
| fTri | 92 | 91 |
| I.I. | 95.2 | 93.8 |
| MFI | 3.7 | 2.8 |

EXAMPLES 8 and 9

These examples illustrate the polymerisation of propylene by means of catalytic systems containing a trialkylaluminium [compound (b)] in which the alkyl radicals contain more than 2 carbon atoms.

The characteristics of these catalytic systems and the results of the polymerisation tests carried out under the conditions of Example 1, Part B are shown in Table IV below.

TABLE IV

| Examples | 8 | 9 |
|---|---|---|
| Catalytic systems | | |
| compound (b) | TBAL | TBAL |
| compound (c) | DIBDMS | DIBDMS |
| quantity of (b) (mmol) | 2 | 2 |
| Al/Ti molar ratio | 8.5 | 15 |
| Al/Si molar ratio | 3.3 | 3.2 |
| Polymerisation results | | |
| act. | 10720 | 11516 |
| AD | 498 | 487 |
| fTri | 90 | 89 |
| I.I. | 96.6 | 95.5 |
| MFI | 0.6 | 1.9 |
| Cl in the polymer (ppm) | 32 | 30 |

EXAMPLE 10R

Example 10R illustrates the polymerisation of propylene under conditions identical to those of Example 5 but by means of a catalytic system containing 2.1 mmol (240 mg) of TEAL (compound b) and 42 mg of compound (a1) described in Example 4, i.e. 0.19 mmol of $TiCl_3$.

This test produces a sticky, non-handleable polymer with an activity of 5971.

It can be deduced from a comparison of Examples 3 to 9 with Example 10R that the presence, in the catalytic systems according to the invention, of the organic oxygenated silicon compound leads to the production of stereospecific polymers.

EXAMPLES 11 to 15R

These examples are intended to illustrate the catalytic systems according to the invention containing a compound (a2) as solid based on complexed titanium trichloride of $\delta$ crystalline form. Examples 11, 12 and 14 are carried out according to the invention and Examples 13R and 15R are given by way of comparison.

EXAMPLES 11

A—Preparation of the Catalytic Solid [compound (a2)]

The composition (0) is obtained by mixing, under an inert atmosphere and at 50° C., 800 ml of Isopar H (a mixture of aliphatic hydrocarbons boiling at 175° C. marketed by Exxon Chemicals), 170 ml of DEAC and 82 ml of isoamyl alcohol. This composition (0) of empirical formula $AlEt_{1.45}(OR^4)_{0.55}Cl$, where $R^4$ represents an isoamyl radical, is stored at room temperature and under a nitrogen purge for 16 hours before being used.

1 l of Isopar H and 150 ml of $TiCl_4$ are introduced into a dry 5-l reactor equipped with a stirrer having a blade rotating at 220 rev/min. While maintaining this $TiCl_4$ solution at 30° C., 690 ml of DIAE are slowly introduced (30 minutes) followed by 970 ml of the composition (0) described above. Introduction of the composition (0) takes place over 60 minutes. After having reduced the stirring rate to 85 rev/min, 450 ml of $TiCl_4$ are introduced over 20 minutes while increasing the temperature in order to reach 100° C. after 15 minutes. The suspension is maintained at 100° C. for 2 hours and the solid formed is isolated by settling and then washed 7 times with 2 l of dry hexane.

This purplish-coloured catalytic solid contains, per kg, 830 g of $TiCl_3$, 1 g of aluminium and 58 g of DIAE; its IPV is 0.095 $cm^3/g$.

All of this solid (i.e. approximately 317 g of solid based on complexed $TiCl_3$) is suspended in 1.8 l of hexane at 30° C., with stirring at 150 rev/min.

780 ml of a hexane solution containing, per litre, 80 g of DEAC and 176 g of Irganox 1076 are slowly introduced (30 minutes) and then 240 ml of propylene over 30 minutes The suspension is kept stirring for 30 additional minutes.

After settling, the resulting prepolymerised catalytic solid is washed with dry hexane, with resuspension of the solid, and then dried by purging with nitrogen in a fluidised bed for 2 hours at 70° C.

The solid thus obtained contains 535 g of $TiCl_3$, 18 g of DIAE and 228 g of prepolymerised propylene.

It is observed that this particularly simple preparation of compound (a) takes place in a single stage.

B—Polymerisation of Propylene in Suspension in the Liquid Monomer

The following are introduced, under purging with dry nitrogen, into a 5 l autoclave which has been dried beforehand:

228 mg (2 mmol) of TEAL (in the form of a solution in hexane containing 200 g/l) marketed by the firm Schering;
  202.8 mg of DIBDMS (in the form of a solution in hexane containing 0.384 mol/l);
  67.7 mg of compound (a2) as prepared above;
  a hydrogen pressure of approximately 1 bar;
  3 l of liquid propylene;

so that the molar ratio of the aluminium of TEAL to the titanium of compound (a2) is equal to 8.5 and that the molar ratio of the aluminium of TEAL to the silicon of DIBDMS is equal to 2.

The reactor is maintained at 65° C. with stirring for 4 hours. After degassing the excess propylene, there is recovered, with an activity of 2673, a polymer with an AD of 343 additionally having an MFI of 6, an fTri of 92 and containing 64.5 ppm of chlorine.

EXAMPLE 12

This example illustrates the polymerisation of propylene maintained in the gaseous state. The catalytic solid based on complexed titanium trichloride of δ crystalline form [compound (a2)] is obtained as in Example 11.

The following are introduced, under a stream of nitrogen and with stirring, into a 5 l autoclave used according to Example 1, Part B:
- 106 mg (0.93 mmol) of TEAL;
- 38 mg (0.19 mmol) of DIBDMS;
- 90 mg of compound (a2) as prepared above, i.e. 48 mg of $TiCl_3$;
- 1 l of liquid propylene.

The temperature is then raised to 50° C. and polymerisation is carried out under these conditions for 10 minutes. The autoclave is then degassed to a pressure of 11 bars absolute while being heated to 75° C. At this temperature, hydrogen and then propylene in the gaseous state are introduced consecutively into the autoclave until a total pressure at the temperature under consideration of 20 bars absolute is reached. After polymerising for 3 hours under these conditions, the reaction is stopped by introduction of 25 ml of a 1 mol/l sodium hydroxide solution.

The activity of compound (a2) is 2870; the AD of the polymer is 343, its MFI is 0.83 and its fTri is 92.

EXAMPLE 13R

This example illustrates polymerisation of propylene in the gaseous phase by means of a catalytic system containing 60 mg of a compound (a2) as described in Example 11 and 250 mg of DEAC.

The polymerisation test carried out under the conditions of Example 12 leads, with an activity of 1833, to a polymer containing 42 ppm of titanium and 540 ppm of chlorine and whose other characteristics are:

AD=344;
MFI=6;
fTri=95.

Comparison of Example 13R with Example 12 carried out according to the invention shows again that the catalytic systems according to the invention are particularly active and that they lead to polymers which are particularly poor in chlorine.

EXAMPLE 14

The catalytic solid based on complexed titanium trichloride of δ crystalline form used in the catalytic system of this example is a compound (a2) deposited in a support.

A—Preparation of Compound (a2)

The composition (0) is obtained by successive introduction, into a 1 litre, round-bottomed flask purged beforehand with nitrogen, of 300 ml of Isopar H, 43.2 ml of DEAC and 20 ml of $Al(OR^4)EtCl$, where $R^4$ represents the isoamyl radical (obtained beforehand by equimolar mixing of DEAC and isoamyl alcohol).

1600 ml of Isopar H, 200 ml of $TiCl_4$, 230 ml of DIAE and 310 g of a silica support (marketed by the firm Grace under the name SG 532) are successively introduced into a 5 litre autoclave, conditioned under nitrogen, equipped with a stirrer having a blade rotating at 250 rev/min. While maintaining the suspension at 30° C., 363 ml of the composition (0) described above are added thereto over 1 hour. The temperature is then increased to reach 100° C. after 1 h.

The reaction mixture is maintained at this temperature for 2 hours and is then brought back to room temperature.

780 ml of a hexane solution containing, per litre, 80 g of DEAC are introduced slowly (30 minutes), followed by 240 ml of propylene over 30 minutes. The suspension is kept stirring for 30 additional minutes.

After settling, the resulting prepolymerised catalytic solid is washed with dry hexane, with resuspension of the solid after each washing, and then dried by purging with nitrogen in a fluidised bed for 2 hours at 70° C. This compound (a2) contains, per kg, 341 g of $TiCl_3$. Its IPV is 0.08 $cm^3/g$.

B—Polymerisation of Propylene in the Gaseous Phase

When subjected to a polymerisation test identical to that described in Example 12, a catalytic system containing 82 mg (0.72 mmol) of TEAL, 36.7 mg of DIBDMS and 98.5 mg of this compound (a2) leads with an activity of 2199 to a polymer having an AD of 413, a non-measurable MFI and an fTri of 93.

EXAMPLE 15R

Example 15R illustrates the polymerisation of propylene under conditions identical to those of Example 10R but by means of compound (a2) prepared as described in Example 14.

The catalytic system used contains 1.9 mmol of TEAL and 69.7 mg of compound (a2), i.e. 23.7 mg of $TiCl_3$.

This test produces, with an activity, of 3981, a sticky non-handleable polymer.

Comparison of Examples 11, 12 and 14 with Example 15R makes it possible to reveal the possible role played in the catalytic systems according to the invention, by the organic oxygenated silicon compound.

EXAMPLE 16

This example illustrates the polymerisation of propylene in an inert hydrocarbon diluent (hexane) by means of a catalytic system containing a compound (a1) prepared as in Example 3, TEAL and dicyclopentyl-dimethoxysilane (DCPDMS) as compound (c).

Polyymerisation is carried out according to the following procedure.

The following are introduced, under purging with dry nitrogen, into a 5 l autoclave which has been dried beforehand:
- 1 l of hexane;
- 157 mg of TEAL;
- 153 mg of DCPDMS;
- 48 mg of compound (a1);

The Al/Ti and Al/Si molar ratios are respectively equal to 7 and to 2.

The temperature being raised to 70° C., there are successively introduced:
- a hydrogen pressure of approximately 1 bar; and
- a propylene pressure of 20 bars before the polymerisation is carried out at this temperature while maintaining the pressure constant by supplying propylene.

After 3 hours, polymerisation is stopped by addition of 250 ml of water containing 25 mmol of sodium hydroxide. The polymer is collected in the form of a suspension which is filtered. The solid polymer fraction is dried and the polymer fraction which is soluble in the hexane of polymerisation is recovered by evaporation.

The polymer thus obtained has an AD of 499 and an MFI of 1.1. The activity of compound (a1) in this test is 3393. The polymer fraction which is soluble in the hexane of polymerisation is 1% by weight with respect to the total weight of polymer formed.

We claim:

1. A catalytic system for the polymerisation of α-olefin, comprising:

(1) a solid based on complexed titanium trichloride of δ crystalline form having an internal pore volume from 0.02 to 0.4 cm³/g generated by pores having radii from 1,000 to 15,000 Å, free of magnesium, obtained by heat treatment, in the presence of a halogenated agent, of a liquid resulting from bringing TiCl₄, pretreated with an electron-donating compound, into contact with a composition of the formula $$AlR_pZ_qX_{3-(p+q)}$$

in which
R represents a hydrocarbon radical containing from 1 to 18 carbon atoms,
Z is selected from the group consisting of —OR⁴, —SR⁴ and —NR⁴R⁵ in which R⁴ and R⁵ each represent a hydrocarbon radical or a hydrogen atom,
X represents a halogen atom,
p is any number such that 0<p<3,
q is any number such that 0<q<3,
the sum (p+q) being such that 0<(p+q)≦3
(2) an organoaluminium compound selected from the non-halogenated organoaluminium compounds of formula $$AlR_mY_{3-m}$$

where
R represents a hydrocarbon radical, containing from 1 to 18 carbon atoms,
Y represents a group selected from the group consisting of —OR¹, —SR¹, and —NR¹R² in which R¹ and R² each represent an identical or different hydrocarbon radical selected from the group consisting of alkyl, aryl, arylalkyl, alkylaryl and cycloalkyl radicals, and m is a number such that 0<m≦3
(3) an organic oxygenated silicon compound selected from the group consisting of compounds of the formula:

$$R'_nSi(OR'')_{4-n}$$

in which
[R¹] R' represents a hydrogen atom or a hydrocarbon radical containing from 1 to 20 carbon atoms, with the proviso that at least one R' is selected from the group consisting of alkyl radicals and cycloalkyl radicals, said radicals containing at least one secondary or tertiary carbon atom, R" represents a hydrocarbon radical containing from 1 to 3 carbon atoms,
n is 2 or 3,
said organoaluminium compound (2) having a molar ratio of aluminium to silicon of said organic silicon compound from 0.1 to 50 and said organoaluminium compound (2) having a molar ratio of aluminium to titanium of said titanium trichloride of δ crystalline form from 1 to 50.

2. The catalytic system according to claim 1, wherein the non-halogenated organoaluminium compound is selected from the group consisting of trialkylaluminiums and their mixtures.

3. The catalytic system according to claim 1, wherein the organic oxygenated silicon compound is selected from the group consisting of dimethoxy- and diethoxysilane, said silicon compound substituted by at least one radical selected from the group consisting of an alkyl radical and a cycloalkyl radical, said radical containing a secondary or tertiary carbon atom in the α, β, or γ position.

4. The catalytic system according to claim 1, wherein the organic oxygenated silicon compound is chosen from diisobutyldimethoxysilane, di(tertbutyl) dimethoxysilane, diisopropyldimethoxysilane, dicyclohexyldimethoxysilane, cyclohexylmethyldimethoxysilane or isobutylmethyldimethoxysilane.

5. The catalytic system according to claim 1, wherein the solid based on titanium trichloride of δ crystalline form is obtained by adding to the medium for the preparation of the said solid, at any time, an organic or inorganic support (S) selected from the group consisting of the preformed polymers, the oxides of silicon, aluminium, magnesium, titanium or zirconium, and mixtures of these oxides.

6. The catalytic system according to claim 1, wherein the molar ratio of the aluminium of the non-halogenated organoaluminium compound to the titanium of the solid based on complexed titanium trichloride of δ crystalline form varies from 1.5 to 25.

7. The catalytic system according to claim 1, wherein the molar ratio of the aluminium of the non-halogenated organoaluminium compound to the silicon of the organic oxygenated silicon compound varies from 1 to 20.

8. A catalytic system for the polymerisation of α-olefin, comprising:
(1) a solid based on complexed titanium trichloride of δ crystalline form having an internal pore volume from 0.02 to 0.4 cm³/g generated by pores having radii from 1,000 to 15,000 Å, free of magnesium, obtained by heat treatment, in the presence of a halogenated agent, of a liquid resulting from bringing TiCl₄, pretreated with an electron-donating compound, into contact with a composition of the formula:

$$AlR_pZ_qX_{3-(p+q)}$$

in which
R represents a hydrocarbon radical containing from 1 to 18 carbon atoms,
Z is selected from the group consisting of —OR⁴, —SR⁴, and —NR⁴R⁵ in which R⁴ and R⁵ each represent a hydrocarbon radical or a hydrogen atom,
X represents a halogen atom,
p is any number such that 0<p<3,
q is any number such that 0<q<3,
the sum (p+q) being such that 0<(p+q)≦3
(2) an organoaluminium compound selected from the non-halogenated organoaluminium compounds of formula $$AlR_mY_{3-m}$$

where
R represents a hydrocarbon radical, containing from 1 to 18 carbon atoms,
Y represents a group selected from the group consisting of —OR¹, —SR¹, and —NR¹R² in which R¹ and R² each represent an identical or different hydrocarbon radical selected from the group consisting of alkyl, aryl, arylalkyl, alkylaryl and cycloalkyl radicals, and m is a number such that 0<m≦3, and
(3) diisobutyldimethoxysilane.

9. A catalytic system for the polymerisation of an α-olefin, comprising:
(1) a solid based on complexed titanium trichloride of δ crystalline form having an internal pore volume from 0.02 to 0.4 cm³g generated by pores having radii from 1,000 to 15,000 Å, free of magnesium, obtained by heat treatment, in the presence of a halogenated agent, of a liquid resulting from bringing TiCl$_4$, pretreated with an electron-donating compound, into contact with a composition of the formula $$AlR_p Z_q X_{3-(p+q)}$$

in which
R represents a hydrocarbon radical containing from 1 to 18 carbon atoms,
Z is selected from the group consisting of —OR$^4$, —SR$^4$, and —NR$^4$R$^5$ in which R$^4$ and R$^5$ each represent a hydrocarbon radical or a hydrogen atom,
X represents a halogen atom,
p is any number such that 0<p<3,
q is any number such that 0<q<3,
the sum (p+q) being such that 0<(p+q)≦3

(2) an organoaluminium compound selected from the non-halogenated organoaluminium compounds of formula $$AlR_m Y_{3-m}$$

where
R represents a hydrocarbon radical, containing from 1 to 18 carbon atoms,
Y represents a group selected from the group consisting of —OR$^1$, —SR$^1$, and —NR$^1$R$^2$ in which R$^1$ and R$^2$ each represent an identical or different hydrocarbon radical selected from the group consisting of alkyl, aryl, arylalkyl, alkylaryl and cycloalkyl radicals, and
m is a number such that 0<m≦3, and (3) dicyclopentyldimethoxysilane.

10. A catalytic system for the polymerization of an α-olefin, comprising:

(1) a solid based on complexed titanium trichloride of δ crystalline form having an internal pore volume from 0.02 to 0.4 cm$^3$/g generated by pores having radii from 1,000 to 15,000 Å, free of magnesium, obtained by heat treatment in the presence of a halogenated agent, of a liquid resulting from bringing TiCl$_4$, pretreated with an electron-donating compound, into contact with a composition of the formula $$AlR_p Z_q X_{3-(p+q)}$$

in which
R represents a hydrocarbon radical containing from 1 to 18 carbon atoms,
Z is selected from the group consisting of —OR$^4$, —SR$^4$,
and —NR$^4$R$^5$ in which R$^4$ and R$^5$ each represent a hydrocarbon radical or a hydrogen atom,
X represents a halogen atom,
p is any number such that 0<p<3,
q is any number such that 0<q<3,
the sum (p+q) being such that 0<(p+q)≦3

(2) a non-halogenated organoaluminium compound selected from the trialkylaluminiums in which the alkyl radicals contain more than two carbon atoms (3) an organic oxygenated silicon compound selected from the group consisting of compounds of the formula:

$$[R^1]R'_n Si(OR'')_{4-n}$$

in which
R' represents a hydrogen atom or a hydrocarbon radical containing from 1 to 20 carbon atoms, with the proviso that at least one R' is selected from the group consisting of alkyl radicals and cycloalkyl radicals, said radicals containing at least one secondary or tertiary carbon atom,
R" represents a hydrocarbon radical containing from 1 to 3 carbon atoms,
n is 2 or 3 said organoaluminium compound (2) having a molar ratio of aluminium to silicon of said organic silicon compound from 0.1 to 50 and said organoaluminium compound (2) having a molar ratio of aluminium to titanium of said titanium trichloride of δ crystalline form from 1 to 50.

* * * * *